Nov. 2, 1971  J. BARCHE  3,616,808
JET ENGINE
Filed Dec. 1, 1969

Inventor:
Jürgen Barche
Spencer & Kaye
BY ATTORNEYS.

United States Patent Office

3,616,808
Patented Nov. 2, 1971

3,616,808
JET ENGINE
Jurgen Barche, Bremen, Germany, assignor to Vereinigte Flugtechnische Werke G.m.b.H., Bremen, Germany
Filed Dec. 1, 1969, Ser. No. 881,148
Claims priority, application Germany, Dec. 10, 1968, P 18 13 761.6
Int. Cl. F02b 27/00
U.S. Cl. 137—15.1                                  7 Claims

ABSTRACT OF THE DISCLOSURE

An aircraft jet engine air intake which is configured to provide smooth air flow under both low- and high-speed conditions. The leading edge is configured to allow for smooth air flow at high speed, there being a shoulder arranged interiorly of the air intake, which shoulder has a leading face that is spaced rearwardly, considered in the direction of the air flow, from the leading edge of the air intake so that the shoulder reduces the inside dimension of the air intake, beginning at a point spaced rearwardly from the leading edge, to a dimension smaller than at the leading edge. The leading face of the shoulder has a streamlined profile which allows the smooth flow of air.

BACKGROUND OF THE INVENTION

The present invention relates to an air intake for jet engines, especially to aircraft jet engines.

More particularly, the present invention relates to an aircraft jet engine air intake which is suitable for the flow velocities which are encountered during low-speed as well as for the flow velocities which are encountered during high-speed flight.

As is known in the art, the contour of jet engine air intake can be designed optimally for only a relatively small speed range. Therefore, in order to provide better air intake characteristics for both low- and high-speed flight, there exist air intakes incorporating a combination of inlets, some of which are designed for optimum operation under low-speed flight conditions and others which are designed for optimum operation under high-speed flight conditions, these inlets being provided with inflatable elements in the inlet zone.

Another way in which the problem at hand has been sought to have been solved, is by providing auxiliary inlets at the air intake, these auxiliary inlets being closed during high-speed flight but being open, for example by means of flaps, during low speeds. Alternatively, these auxiliary inlets can be constituted by slits which come into being when the air inlet is shifted.

Thus, all of the known devices by means of which the air intake characteristics are sought to be optimized for both low- and high-speed flight involve the use of mechanically movable parts which, it will be appreciated, are not only expensive to install and maintain, but are also subject to malfunction.

It is, therefore, the primary object of the present invention to provide a jet engine air intake which has no moving parts but which nonetheless will provide approximately optimum characteristics throughout a wide speed range, thus allowing the engine to operate with minimum losses.

SUMMARY OF THE INVENTION

In accordance with the present invention, the primary object is accomplished in that there is provided an aircraft jet engine air intake which is configured to provide smooth air flow under both low- and high-speed conditions. The leading edge is configured to allow for smooth air flow at high speed, there being a shoulder arranged interiorly of the air intake, which shoulder has a leading face that is spaced rearwardly, considered in the direction of the air flow, from the leading edge of the air intake so that the shoulder reduces the inside dimension of the air intake, beginning at a point spaced rearwardly from the leading edge, to a dimension smaller than at the leading edge. The leading face of the shoulder has a streamlined profile which allows the smooth flow of air. Consequently, air entering the air intake at high speed flows smoothly past the leading edge of the air intake, thence along the inner surface of that portion of the air intake which is unoccupied by the shoulder, thence over the leading face of the shoulder, and thence along the inner surface of the shoulder. Air entering the air intake at low speeds, on the other hand, will separate at the leading edge of the intake and attach on the shoulder and will thereafter flow smoothly along the inner surface of the shoulder.

According to further features of the present invention, the leading face of the shoulder is bevelled, and joins the inner surface of the air intake by way of a rounded concave corner and the inner surface of the shoulder by way of a rounded convex corner.

According to yet another feature of the present invention, the radii of curvature of the rounded corners are of the same order of magnitude as the thickness of the shoulder.

BRIEF DESCRIPTION OF THE DRAWINGS

FIG. 1 shows the air flow under low-speed conditions, while FIG. 2 shows the air flow under high-speed conditions.

DETAILED DESCRIPTION OF THE PREFERRED EMBODIMENTS

Figure 1:
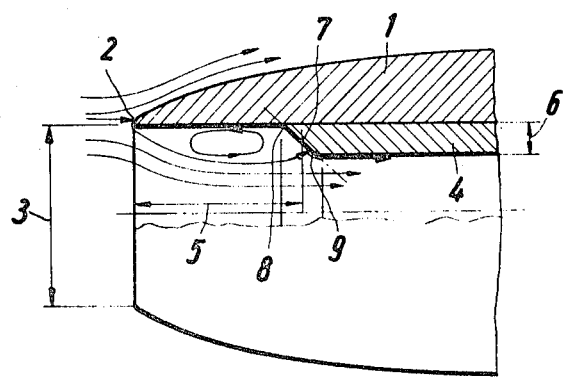
FIGS. 1 and 2 are elevational views, partly in section, of an aircraft jet engine air intake according to the present invention.
Figure 2:
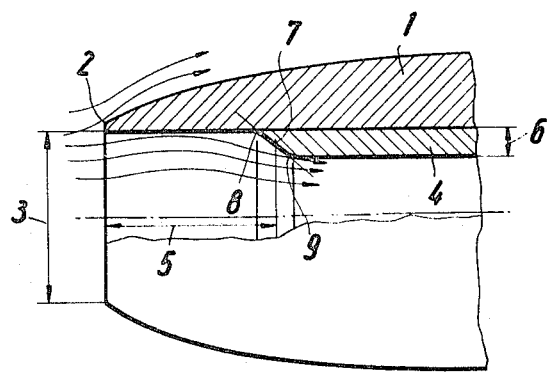

Referring now to the drawings, FIGS. 1 and 2 show the air intake 1 of an aircraft jet engine, whose leading edge 2 is configured to allow for smooth air flow conditions at high speed in that it has the small radius of curvature which is desirable for optimum flow at high-speed flight. The inside diameter of the forward end of the intake is shown at 3. The interior of the intake is, in accordance with the present invention, provided with a shoulder 4 which is spaced rearwardly from the leading edge considered in the direction of flow of the incoming air, a distance indicated at 5. The shoulder, whose radial dimension or thickness is shown at 6, has at its own leading edge, a streamlined profile which facilitates the flow of air. In the illustrated embodiment, the leading face 7 of the shoulder 4 is bevelled at an angle of about 45°, the transition between the outer leading edge of the bevelled face 7 joining the inner surface of the intake 1 being a rounded concave corner 8 and the transition between the inner, trailing edge of the face 7 joining the inner surface of the shoulder 4 being a rounded convex corner 9. In practice, the radii of curvature of the corners 8 and 9 will be of the same order of magnitude as the radial thickness 6 of the shoulder 4.

The rounded corner 8 influences the distance which the shoulder is recessed from the leading edge of the air intake, so that the greater the radius of curvature of the corner 8, the less need be the distance 5 by which the shoulder is rearwardly recessed. The rounded corner 9, on the other hand, influences the smoothness of the air flow.

In low-speed flight, i.e., at speeds less than about 0.4 Mach number, the air flow will be as shown in FIG. 1. The flow separates as it flows past the leading edge 2. However, the air will then reattach as it comes to move over the shoulder 4, and is thus able to negotiate the diffusors (not shown) without further separation. Since the energy loss which is brought about by the vortices in the region where the separation takes place, i.e., in the region exending axially through the distance 5 and radially in the space defined by the forward projection of the shoulder, is considerably less than the energy loss which would result from complete flow separation inside the air intake, the pressure which is won back in substantially larger and is, in practice, comparable to that achieved in an air intake which is designed for low-speed flight conditions.

FIG. 2 shows the air flow under high-speed conditions, i.e., above about 0.4 Mach number. Due to the sharp leading edge 2 of the air intake, resulting from the small radius of curvature of this edge, as described above, and due also to the fact that the shoulder 4 is recessed rearwardly of the leading edge of the air intake, the flow will be non-separated along the inside of the air intake, i.e., along the wall constituting the inner surface of the air intake. Moreover, thanks to the above-described configuration of the shoulder 4, the air will continue to flow past the shoulder 4 without further separations.

It will thus be seen that, in accordance with the present invention, air entering the air intake at high speed flows smoothly past the leading edge 2 of the air intake 1, thence along the inner surface of that portion of the air intake which is unoccupied by the shoulder 4—this being the axial region indicated by the length 5— thence over the leading face 7 of the shoulder, and thence along the inner surface of the shoulder. Air entering the air intake at low speeds on the other hand, will encounter a region of separation which is limited to the space unoccupied by the shoulder and will thereafter flow smoothly along the inner surface of the shoulder.

In practice, the radial thickness 6 of the shoulder 4 will be so selected as to be proportional to the permissible losses at zero forward speed and hence a function of the design speed of the aircraft with which the engine is to be used. Moreover, the rearward displacement 5 of the shoulder 4 will depend on the permissible disturbance of the speed distribution on the outer surface at high speed.

Moreover, it will be understood that the air flow may, in practice, vary somewhat from those depicted in FIGS. 1 and 2. For example, the size and intensity of the region of separation depicted in FIG. 1 will depend on the air speed and angle of attack, and the actual conditions of the of the air flow at intermediate speeds, i.e., at speeds between take-off and cruise, will be somewhere between the air flow conditions depicted in FIGS. 1 and 2.

The following is an illustrative and not limitative example of an aircraft jet engine air intake according to the present invention, it being understood that the numercal values may vary within relatively wide limits, depending on the particular size of the engine and the design speeds of the aircraft in which the engine is to be used.

In an exemplary air intake arrangement according to the present invention, the inside diameter 3 of the intake is 1000 mm. and the radial thickness 6 of the shoulder 6 is 60 mm. The leading face 7 of the shoulder 4 is bevelled at 45°, and the distance 5 between the midpoint of this face 7 and the plane of the leading edge 2 is 150 mm. The radius of curvature of the concave corner 8 is 200 mm. and the radius of curvature of the convex corner 9 is 250 mm. The radius of curvature of the leading edge 2 is 6 mm. The air flow conditions depicted in FIGS. 1 and 2 respectively, will occur approximately up to 0.4 and 0.7 Mach number, respectively.

It will be understood that the above description of the present invention is susceptible to various modifications, changes and adaptations, and the same are intended to be comprehended within the meaning and range of equivalents of the appended claims.

I claim:
1. In an aircraft jet engine, an air intake configured to provide smooth air flow under both low- and high-speed subsonic conditions and comprising, in combination:
   (a) means forming a leading edge configured to allow for smooth air flow at high speed; and
   (b) a shoulder arranged interiorly of the air intake, said shoulder beginning at a point spaced rearwardly, considered in the direction of the air flow, from said leading edge of the air intake, said shoulder having a leading face and reducing the inside dimensions of the air intake, said leading face having a streamlined profile which allows the smooth flow of air, in consequence of which air entering the air intake at high speed flows smoothly past said leading edge of the air intake, thence along the inner surface of that portion of the air intake which is unoccupied by said shoulder, thence over the leading face of said shoulder and thence along the inner surface of said shoulder, whereas air entering the air intake at low speed encounters a region of separation limited to the space unoccupied by said shoulder and thereafter flows smoothly along the inner surface of said shoulder.
2. An aircraft jet engine air intake as defined in claim 1, wherein the thickness of said shoulder is proportional to the permissible low-speed losses and hence a function of the design speed of the aircraft with which the engine is to be used, and wherein the rearward displacement of said shoulder is dependent on the permissible disturbance of the speed distribution on the outer surface of the air intake at high speed.
3. An aircraft jet engine air intake as defined in claim 1, wherein said leading face of said shoulder is bevelled.
4. An aircraft jet engine air intake as defined in claim 3, wherein said leading face of said shoulder is bevelled at an angle of about 45°.
5. An aircraft jet engine air intake as defined in claim 3, wherein said bevelled leading face of said shoulder joins the inner surface of said air intake by way of a rounded concave corner and joins the inner surface of said shoulder by way of a rounded convex corner.
6. An aircraft jet engine air intake as defined in claim 5, wherein the radii of curvature of said rounded corners are of the same order of magnitude as the thickness of said shoulder.
7. In an aircraft jet engine, an air intake configured to provide smooth air flow under both low-speed and high-speed subsonic conditions and comprising, in combination :
   (a) means forming a leading edge configured to allow for smooth air flow at high speed; and
   (b) a shoulder arranged interiorly of the air intake, said shoulder having a leading face which is spaced rearwardly, considered in the direction of the air flow, from said leading edge of the air intake, said shoulder reducing the inside dimensions of the air intake, beginning at a point spaced rearwardly from said leading edge, to a dimension smaller than at said leading edge and leaving said air intake with unreduced inside dimensions throughout that portion of its length which extends from said leading edge to said point, said leading face of said shoulder having a streamlined profile which allows the smooth flow of air, in consequence of which air entering the air intake at high speed flows smoothly past said leading edge of the air intake, thence along the inner surface of that portion of the air intake which is unoccupied by said shoulder, thence over the leading face of said shoulder and thence along the inner surface of said shoulder, whereas air entering the air intake at low speed encounters a region of separation limited to the space unoccupied by said shoulder and thereafter flows smoothly along the inner surface of said shoulder.

References Cited

UNITED STATES PATENTS

| 2,780,913 | 2/1957 | Nicks | 138—45 |
| 2,971,329 | 2/1961 | Barry | 137—15.2 |

ALAN COHAN, Primary Examiner